(12) United States Patent
Randall et al.

(10) Patent No.: US 7,094,292 B2
(45) Date of Patent: Aug. 22, 2006

(54) MECHANISM FOR APPLYING PAINT TO CANVAS

(76) Inventors: John N. Randall, 2906 Ambleside La., Richardson, TX (US) 75082; Christian H. Seidler, 5309 Victory Dr., Marshall, TX (US) 75672; Charles D. Gray, Jr., RR #2 Box 133, Sabrina La., Karnack, TX (US) 75661

( * ) Notice: Subject to any disclaimer, the term of this patent is extended or adjusted under 35 U.S.C. 154(b) by 940 days.

(21) Appl. No.: 09/838,549

(22) Filed: Apr. 18, 2001

(65) Prior Publication Data

US 2002/0000973 A1    Jan. 3, 2002

Related U.S. Application Data

(60) Provisional application No. 60/198,295, filed on Apr. 19, 2000.

(51) Int. Cl.
*B05C 11/02*    (2006.01)
*B05C 11/10*    (2006.01)

(52) U.S. Cl. .................. 118/679; 118/680; 118/676; 118/108; 118/109; 118/206; 118/207; 118/323

(58) Field of Classification Search ............. 118/323, 118/108, 109, 206, 207, 676, 679, 680; 239/114, 239/115
See application file for complete search history.

(56) References Cited

U.S. PATENT DOCUMENTS

| 3,321,331 A | * | 5/1967 | McNeely .................. 401/22 |
| 5,594,652 A | * | 1/1997 | Penn et al. ............... 700/119 |
| 5,859,775 A | * | 1/1999 | Barlage et al. ........... 700/108 |
| 5,932,012 A | * | 8/1999 | Ishida et al. ............. 118/669 |

* cited by examiner

*Primary Examiner*—George Koch

(57) ABSTRACT

A mechanism and method for depositing oil paints, acrylics, or other textural paints provides a means for automating the process of painting a picture. The process can be programmed into a data base which is stored and used at will, or the artist can utilize control means such as a joy stick to provide real-time input.

2 Claims, 3 Drawing Sheets

MECHANISM FOR APPLYING PAINT TO CANVAS

CROSS-REFERENCE TO OTHER APPLICATION

This application claims priority from Ser. No. 60/198,295, filed Apr. 19, 2000, which is hereby incorporated by reference.

BACKGROUND AND SUMMARY OF THE INVENTION

The present application relates to the production of paint on canvas works of art by use of a programmable mechanism which applies paint to a canvas and, if desired, modifies the texture and or distribution of the deposited paint.

1. Background: Limitations in Art

The process of producing art with paint on canvas has remained a principally manual process. Manual methods of producing paintings severely limits the number of works a single artist can produce. Some enterprising artists have attempted to overcome this limitation by employing apprentices to do much of the work and then have the principle artist add finishing touches and a signature. In this day and age of mass marketing and rapid distribution the gap between an artist's productivity and the demand for his work is particularly large. Modern printing technology can capture a two dimensional image of an original artwork and prints of former and modern masters are for sale all over the globe. However, prints do not capture the texture of the original works which are often an important part of the artist's work. Recently some reproductions of paintings have been made to appear more like original paintings by adding some texture to prints. This texturing can be added by the artist or one of their apprentices.

2. Machine Assisted Painting

The present application discloses a mechanized method of applying paint directly to the canvas to produce an original work of art more efficiently than is possible with manual methods. The deposited paint can be further distributed by the mechanism or the artist can add his own touches to produce the desired effect of paint on canvas. The result is an original painting on canvas produced by the artist with the aid of this labor saving device.

The mechanism is a plotter which moves to selected positions and deposits the required amount of paint directly on the canvas. After paint deposition, the mechanism is capable of further distributing the paint on the canvas in any number of ways.

The disclosed innovations, in various embodiments, provide one or more of at least the following advantages:

paintings can be produced much quicker;

painting has three-dimensional aspect of manual work;

cost-effective;

works can be reproduced easily;

works can be modified by changing programming.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
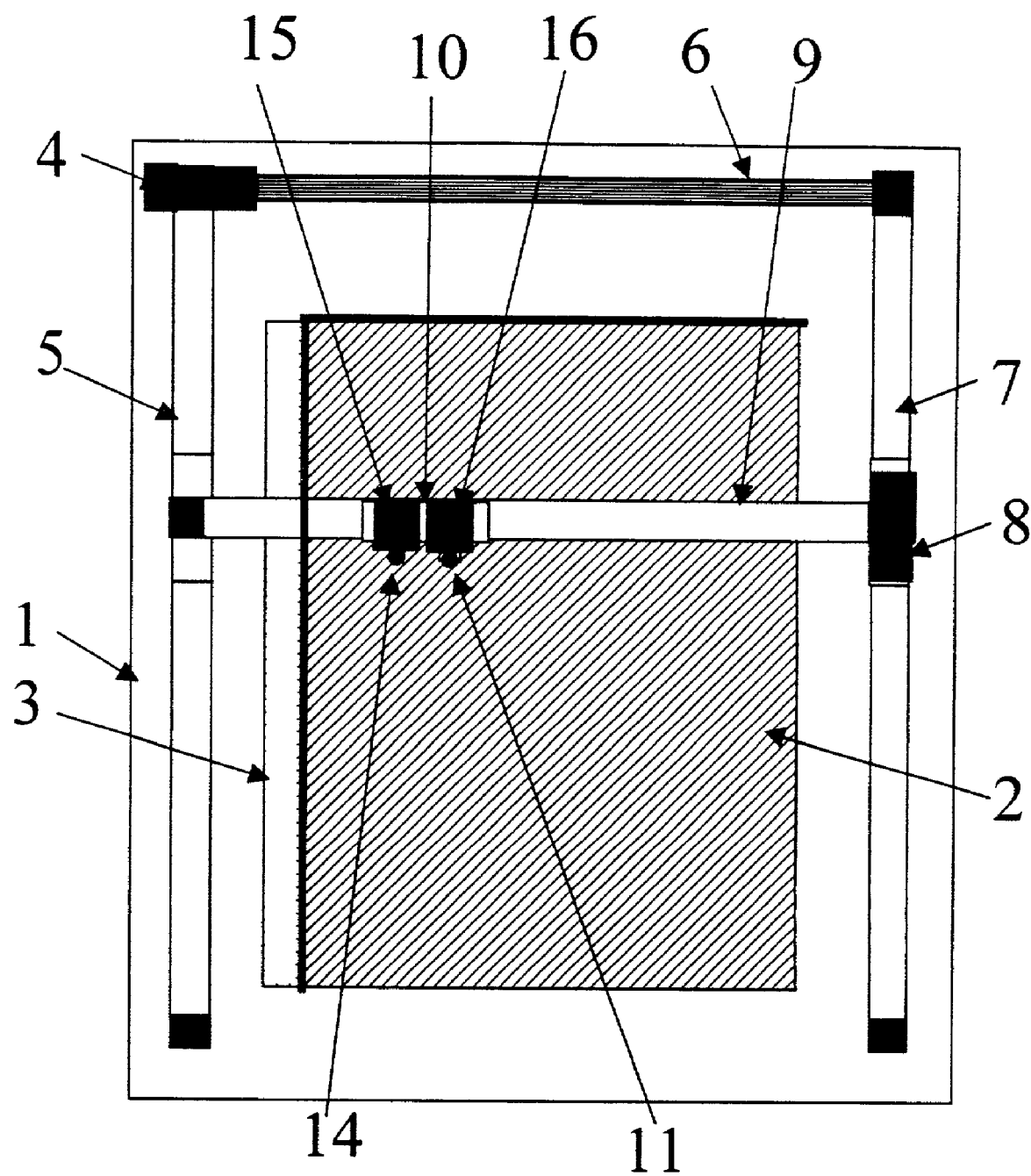
FIG. 1 shows a top-down view of one embodiment of the disclosed mechanism.

The numerous innovative teachings of the present application will be described with particular reference to the presently preferred embodiment (by way of example, and not of limitation).

Prior to using the mechanism disclosed herein, programming must be created to specify what amounts of what color paint need to be delivered to which location in what order. If further distribution or texturing of the paint is desired, this will also be included in the programming. Co-pending U.S. non-provisional application 09/838,588 (filed simultaneously with this application and issued as U.S. Pat. No. 6,813,378 on 2 Nov. 2004) describes one method which can be used to program the mechanism to create a specific type of painting in the style known as Matricism. This is, of course, only one means by which the mechanism can be programmed.

The painting mechanism bears some resemblance to a graphing plotter or ink jet printer. It moves, in two dimensions, some implement for depositing a substance or substances on a flat substrate for the purpose of producing an image. However the invention differs from a graphics plotter or ink jet printer in several fundamental ways. For instance, a graphics plotter or ink jet printer deposits ink, forming a simple two-dimensional image, while the disclosed mechanism deposits oil paints, acrylic or similar substances, creating paintings that have 3 dimensional structure.

Similarly, conventional printers and plotters deposit their ink on the paper and do nothing more. The disclosed mechanism, on the other hand, not only deposits the paint on a stretched canvas, but has the capability of further distributing or texturing the deposited paint.

The present application produces paint on canvas works of art by use of a programmable mechanism which applies paint to a canvas and, if desired, modifies the texture and or distribution of the deposited paint. One embodiment of the invention uses a three axis motion control system, The plane of the painting will be referred to as the X-Y plane which will be considered to be horizontal in this description. The vertical axis will be referred to as the Z axis. Such motion control systems are readily available from companies such as Parker Automation. The paint can be applied by a fluid dispensing unit which is essentially a syringe that is loaded with paint, The dispensing of paint is accomplished by pneumatic pressure applied to the syringe, where the valve that controls the pressure is itself controlled by a computer. Such fluid dispensing systems are available from EFD Corp. The syringe is mounted on the X-Y-Z motion controller which positions the syringe in relation to the canvas to apply the desired amount and color of paint.

The mechanism relies on some method of determining the desired information describing the specific color of paint, the position on the canvas, and the amount of paint desired to create a work of art. In at least some embodiments, this information can be determined by the artist in real time. This is accomplished, for example, by manual control via a joystick or other input device. In at least some embodiments, the information is encoded in data files that can be used to control the deposition and re-distribution of paint. The present application assumes a method which will provide a list of positions and amounts for each color paint required to produce an art painting. One method is described in a related U.S. non-provisional patent application 09/838,588, which issued as U.S. Pat. No. 6,813,378, "Method for Designing Matrix Paintings and Determination of Paint Distribution", and shares at least some inventors with the present application.

Figure 2:
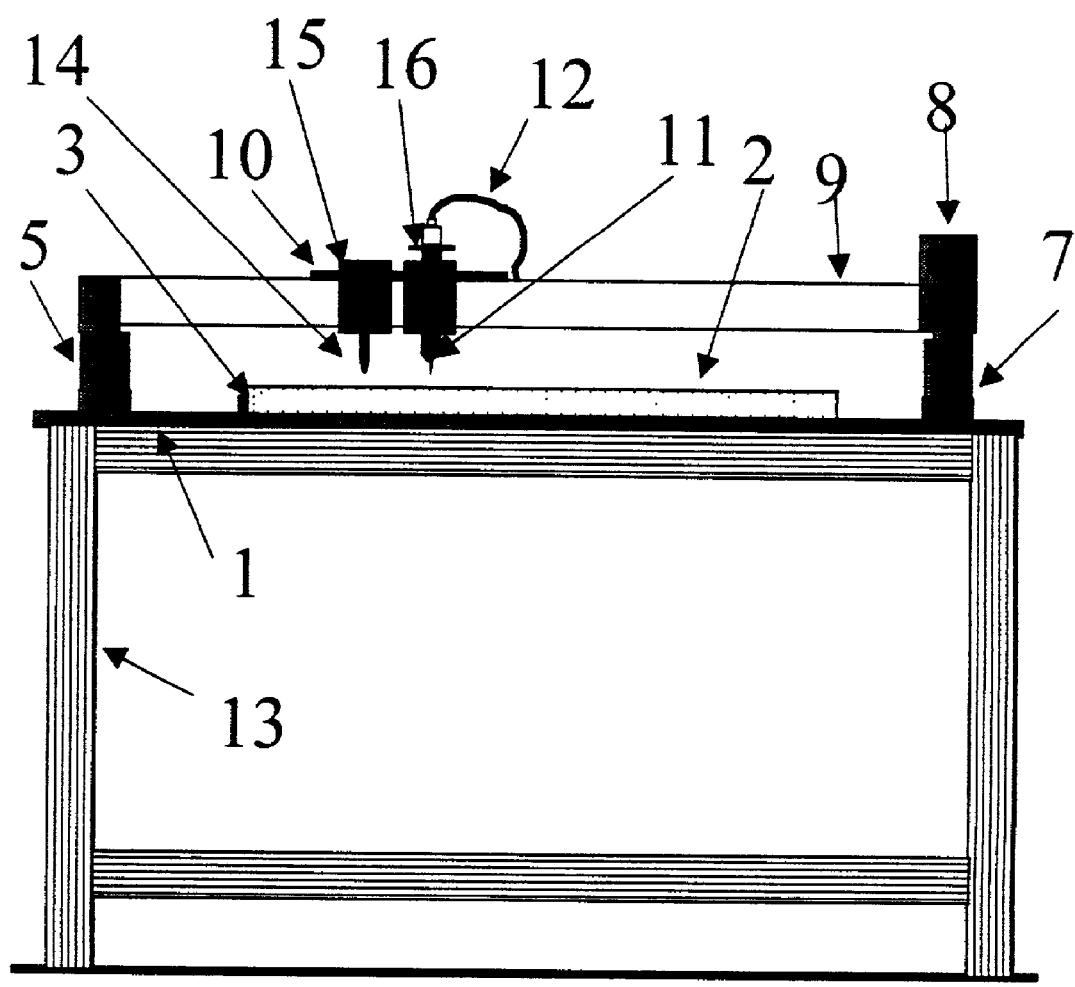
FIG. 2 shows a side view of one embodiment of the disclosed mechanism.

FIGS. 1 and 2 will now be used to help describe the mechanism. The mechanism is mounted on a table top 1 which sits on top of a suitable table frame 13. The canvas 2 is attached to the table top 1 by a mounting bracket 3. The syringe 11 for dispensing the paint is mounted on a Z axis actuator 16. A brush 14, knife, or other implement for distributing or manipulating the paint once it is deposited on the canvas is attached to another Z axis actuator 15. The syringe 11, its Z axis actuator 16, the brush 14, and its Z axis actuator 15 are all mounted on the platform 10 which is moveable in the horizontal XY plane by means of belt drive actuators 5, 7, 9. An air hose 12 is used to supply the pressure that forces the paint out of the syringe 11.

The Y axis positioning is accomplished by the Y belt driven actuator 5 and the Y' belt driven actuator 7. Both the Y actuator 5 and the Y' actuator 7 are driven by the Y drive stepper motor 4. The Y actuator 5 is driven directly by the Y drive stepper motor 4 while the Y' actuator 7 is driven via the shaft 6 which is turned by the Y drive stepper motor 4. Linked by the shaft 6, the motion for both the Y and Y' actuators 5, 7 is made in concert.

The belt driven X actuator 9 sits on top of the Y and Y' actuators 5, 7 and is moved in the Y direction by the two actuators 5 and 7. The X drive stepper motor 8 is used to drive the X actuator 9 and is attached to it and therefore is also moved in the Y direction by the Y and Y' actuators 5 and 7. The platform 10 with syringe 11 and brush 14 is attached to and moved in the X direction by the X actuator 9. By appropriate operation of the stepper motors 4 and 9, the Y, Y' and X actuators can place the syringe 11 or brush 14 at any position over the canvas. The paint may be deposited at discrete locations with the syringe in a stationary position, or may be deposited as the syringe is being moved by the actuators.

The Z motion actuator 16 drops the syringe 11 down a short distance to just above the canvas for deposition of the paint. After paint deposition, the syringe 11 is raised by the Z motion actuator 16, so that it may be moved in X and Y without the tip dragging through previously deposited paint. The brush 14 or other paint manipulating implement can then be used to redistribute the paint deposited on the canvas. This redistribution of paint is accomplished by the coordinated motion of the brush 14 using the actuators 5, 7, 9, and 15.

All of these components will be controlled by an electronic motion control system. Such motion control systems are commercially available, and example is the Parker CompuMotor system.

It should be noted that the X, Y, and Z positioning system can include features such as encoders to provide position feedback, limit switches to guard against driving the positioning systems beyond their intended travel limits, and homing switches to help set absolute values to the positioning systems. All of these features are readily available equipment on modern motion control systems. In the embodiment described here the X & Y axis actuators are belt driven with stepper motors and the two Z axis actuators are pneumatic. Other embodiments using servo motors, and lead screw drives, or other types of actuators could be designed by anyone skilled in the art of motion control.

Producing a Painting with Painting Mechanism

The following discussion assumes that all of the choices required to make a painting have been determined beforehand and are organized into data files. While all of this information can be spontaneously determined by the artist, this discussion assumes that the information is supplied to the mechanism in stored data files. One of many possible ways to organize this information would be as follows.

1. A list of the colors required to make the painting.
2. The sequence in which the colors are to be applied. This sequence would include at least as many entries as the number of colored paints, but could have one or more of the colors show up multiple times in the sequence.
3. For each entry in the sequence list, the position on the canvas and the amount of paint to be deposited on the canvas are required, along with whatever information is required to describe the redistribution of paint on the canvas for each location. We will refer to this list of information as the Color-n-file where "n" is the number in the color sequence.

Figure 3:
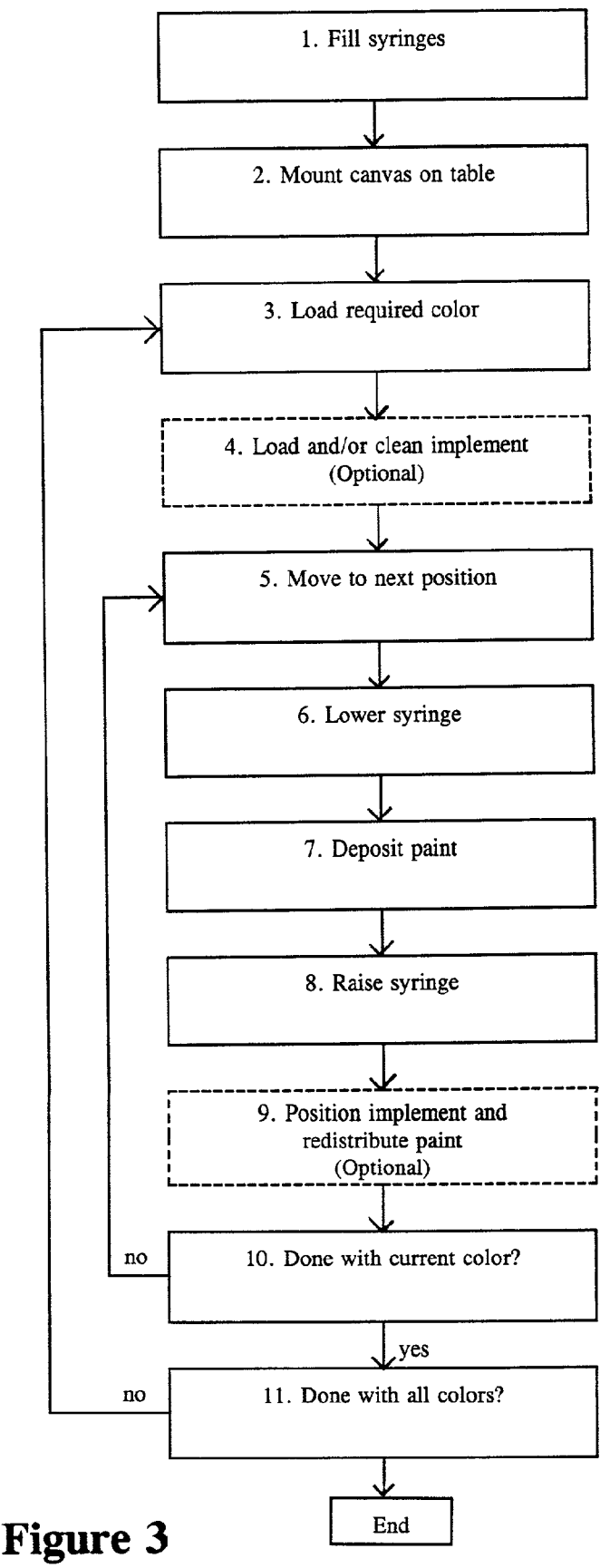
FIG. 3 shows a flowchart of the process.

A painting can then be produced, as shown in the flowchart of FIG. 3, by the following steps:

1. Syringes are filled with the desired colors of paints. There can be as few or as many colors as the artist desires and the programming allows.
2. The canvas is mounted on the table. It is important that the canvas is positioned precisely, so that the painting produced is not off-center in any direction.
3. The control program starts reading the data file containing painting instructions. The first (next) color in the sequence has its paint-filled syringe mounted on its respective Z actuator. This step can be accomplished either manually or in some automated fashion.
4. Similarly, if the paint is to be redistributed after deposition, the proper paint distribution implement (e.g. brush, knife or other implement) is mounted on its Z actuator. When this is the first color to be used, the implement is expected to be clean, but as new colors are implemented, it is generally necessary to either clean the paint manipulation implement or to replace it.
5. The XY actuators move the syringe 11 to the first (next) XY position specified for the current color in the Color-file.
6. The Z axis actuator 16 drops syringe 11 down close to the canvas 2.
7. Air pressure is applied to the syringe at a pressure and length of time determined to deposit the desired amount of paint.
8. The Z axis actuator 16 raises the syringe 11 up a short distance above the canvas. This avoids dragging the syringe through the deposited paint.
9. Optionally, the XY actuators then position the paint manipulation implement 14 over the paint just deposited. The XY actuators and the Z actuator 15 perform the motion required to redistribute the paint on the canvas. It may be necessary to clean the implement periodically if the build up of paint on the implement hampers the desired redistribution of paint.
10. If there are still instructions for the current color, steps 5–9 are repeated until all of the positions requiring the current paint are finished.
11. If other colors remain to be processed, the process goes back to step 3, where a new color is loaded, and, if necessary, a new implement is loaded or the old implement cleaned.

Once all colors have been applied, the process is completed and the canvas be removed from the mechanism for drying.

As has been stated before, the artist also has the ability to use this mechanism for real-time input. Rather than relying on a previously stored data base, the artist can use, e.g., a joy stick to position the syringe over the canvas and deposit the paint. Mechanism such as this can also be adapted for use by handicapped artists, e.g. those with a limited range of movement, to facilitate the creation of artistic works.

According to a disclosed class of innovative embodiments, there is provided: An automated mechanism to deposit oil paint or similar substances on a canvas.

According to another disclosed class of innovative embodiments, there is provided: An automated mechanism to deposit and redistribute oil paint or a similar substance on a canvas.

According to another disclosed class of innovative embodiments, there is provided: An automated mechanism to deposit oil paint or similar substances on a canvas comprising: an attachment mechanism through which a canvas suitable for painting is held in place; a deposition mechanism for depositing a selectable amount of paint through a well defined opening onto a canvas held by said attachment mechanism; a motion control mechanism, attached to said deposition mechanism to move said deposition mechanism to a desired position with respect to the canvas; and a control system which receives external data describing an amount of a given paint which is to be deposited at a pre-determined position on the canvas and which controls said motion control system and paint deposition mechanism.

According to another disclosed class of innovative embodiments, there is provided: A automated method of painting a picture having three-dimensional texture, comprising the steps of: inputting into a painting machine a data base which contains at least instructions on colors of paint, locations of their deposition, and amounts of paint to be distributed; loading a known color of paint into a paint distribution mechanism which is part of said painting machine; repeatedly depositing given amounts of said known color of paint at respective locations described in said instructions; repeating said loading step and said depositing step for each color specified in said data base.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

While the mechanism described deposits paint in a serial fashion one color at a time, there is no reason that paint could not be deposited to multiple locations in parallel with each location receiving a specific color. Both the method of depositing paint and the method of texturing or redistributing can be varied in many ways.

The artist can override an automated process at any time, or conversely, the artist can operate in real time for early steps, then turn over later steps to a pre-programmed file.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. An automated mechanism to deposit textured paint onto a canvas comprising:

an attachment mechanism through which a canvas suitable for painting is held in place;

a deposition mechanism for depositing a selectable amount of paint through a well defined opening onto a canvas held by said attachment mechanism;

a motion control mechanism, attached to said deposition mechanism to move said deposition mechanism to a desired position with respect to the canvas; and a control system which receives external data describing an amount of a given paint which is to be deposited at a pre-determined position onto the canvas and which controls said motion control system and paint deposition mechanism;

further comprising a painting implement attached to said motion control system to be used to redistribute paint on the canvas.

2. The automated mechanism of claim 1, wherein said painting implement is a brush.

* * * * *